United States Patent
Gao et al.

(10) Patent No.: US 9,366,942 B2
(45) Date of Patent: Jun. 14, 2016

(54) IR-CUT FILTER HAVING RED ABSORBING LAYER FOR DIGITAL CAMERA

(75) Inventors: Lu Gao, San Jose, CA (US); Hongjun Li, San Jose, CA (US)

(73) Assignee: OmniVision Technologies, Inc., Santa Clara, CA (US)

( * ) Notice: Subject to any disclaimer, the term of this patent is extended or adjusted under 35 U.S.C. 154(b) by 1022 days.

(21) Appl. No.: 13/316,185

(22) Filed: Dec. 9, 2011

(65) Prior Publication Data

US 2013/0147965 A1 Jun. 13, 2013

(51) Int. Cl.
H04N 5/33 (2006.01)
G03B 11/00 (2006.01)
G02B 5/28 (2006.01)

(52) U.S. Cl.
CPC .............. *G03B 11/00* (2013.01); *G02B 5/282* (2013.01)

(58) Field of Classification Search
CPC ......... G03B 11/00; G02B 5/282; G02B 26/02
USPC ....................... 348/162, 164; 359/359; 385/31
See application file for complete search history.

(56) References Cited

U.S. PATENT DOCUMENTS

| | | | |
|---|---|---|---|
| 4,942,103 A | 7/1990 | Reithel et al. | |
| 7,038,722 B2 | 5/2006 | Kitagishi | |
| 7,365,329 B2 | 4/2008 | Hsiao | |
| 7,664,390 B2 | 2/2010 | Cho et al. | |
| 7,724,454 B2 | 5/2010 | Lin | |
| 8,693,089 B2 | 4/2014 | Saitoh et al. | |
| 2005/0068433 A1 | 3/2005 | Aotsuka | |
| 2006/0182389 A1* | 8/2006 | Duine | G02B 26/02 385/31 |
| 2010/0321770 A1* | 12/2010 | Pyo et al. | 359/359 |
| 2013/0094075 A1 | 4/2013 | Saitoh et al. | |

FOREIGN PATENT DOCUMENTS

| | | | | |
|---|---|---|---|---|
| CN | 102985856 A | | 3/2013 | |
| EP | 2 267 496 | | 12/2010 | |
| JP | 2007-201536 A | | 8/2007 | |
| TW | 200521491 | * | 7/2005 | ............... G02B 5/22 |

OTHER PUBLICATIONS

ROC (Taiwan) Patent Application No. 101102623, First Office Action and Search Report issued Jun. 23, 2014, 15 pages.
PRC (China) Patent Application No. 201210041766.5, First Office Action and Search Report with English translation, issued Feb. 10, 2015, 24 pages.

(Continued)

*Primary Examiner* — Allen Wong
(74) *Attorney, Agent, or Firm* — Blakely Sokoloff Taylor & Zafman LLP

(57) ABSTRACT

An infrared cut filter may be used with an image sensor to remove infrared light components from image light received from a first side of the infrared cut filter prior to the image light reaching the image sensor to be disposed on a second side of the infrared cut filter. The infrared cut filter includes at least one red absorbing layer and an infrared reflector. The at least one red absorbing layer partially absorbs red light components within the image light. The infrared reflector reflects the infrared light components. The infrared reflector is disposed between the red absorbing layer and the first side of the infrared cut filter while the at least one red absorbing layer is disposed between the infrared reflector and the second side of the infrared cut filter.

22 Claims, 12 Drawing Sheets

(56) References Cited

OTHER PUBLICATIONS

PRC (China) Patent Application No. 201210041766.5, Second Office Action with English translation, issued Sep. 22, 2015, 7 pages.

PRC (China) Patent Application No. 201210041766.5, Third Office Action with English translation, issued Apr. 12, 2016, 8 pages.

* cited by examiner

IR-CUT FILTER HAVING RED ABSORBING LAYER FOR DIGITAL CAMERA

TECHNICAL FIELD

The present invention relates generally to digital cameras and in particular, but not exclusively, to infrared ("IR") cut filters for use in digital cameras.

BACKGROUND

Digital cameras are ubiquitous. They are used in a wide range of devices, from expensive and complex equipment to cell-phones and webcams. A digital still or video camera includes at least an imaging lens and an image sensor. Typically the image sensor is a complementary-metal-oxide-semiconductor ("CMOS") image sensor, but a charged coupled device ("CCD") image sensor is also possible. The imaging lens forms an image at the image sensor. The image sensor typically includes millions of pixels or light sensing elements sensitive to one of three primary colors, e.g., red, green, and blue. Each pixel detects and transforms the light intensity at the pixel into an electric signal. Accordingly, a color image formed by the imaging lens is detected and transformed into electric signals. In other words, an optical color image is transformed by the image sensor into an electronic color image.

In contrast to the human eye, CMOS and CCD image sensors are typically also sensitive to near infrared light. Near infrared light, or for simplicity, IR light as referred in this disclosure, will also be detected. However, CMOS and CCD image sensors are typically not sensitive to IR light beyond the near infrared spectrum. Detected IR image generates errors in a displayed image, which is produced in the three primary colors, e.g., red, green, and blue.

To eliminate or reduce errors in the produced primary color images caused by the detected IR image, an IR-cut filter ("IRCF"), also known as an IR cut-off filter, is disposed between the imaging lens and the image sensor, such that IR light is blocked by the IR-cut filter while visible light is transmitted through the IR-cut filter. Thus, the use of an IR-cut filter achieves more realistic colors in white light. However, IR-cut filters can cause other problems as described in the following sections.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified. The drawings are not necessarily to scale, emphasis instead being placed upon illustrating the principles being described. In the drawings, the thickness of layers and regions may be exaggerated for clarity.

DETAILED DESCRIPTION

Embodiments of an IR-cut filter used in a digital camera are described. Numerous specific details are described to provide a thorough understanding of embodiments of the invention, but one skilled in the relevant art will recognize that the invention can be practiced without one or more of the specific details, or with other methods, components, materials, etc. In some instances, well-known structures, materials, or operations are not shown or described in detail to avoid obscuring certain aspects, but are nonetheless encompassed within the scope of the invention.

Reference throughout this specification to "one embodiment" or "an embodiment" means that a particular feature, structure, or characteristic described in connection with the embodiment is included in at least one described embodiment. Thus, appearances of the phrases "in one embodiment" or "in an embodiment" in this specification do not necessarily all refer to the same embodiment. Furthermore, the particular features, structures, or characteristics may be combined in any suitable manner in one or more embodiments.

Figure 1:
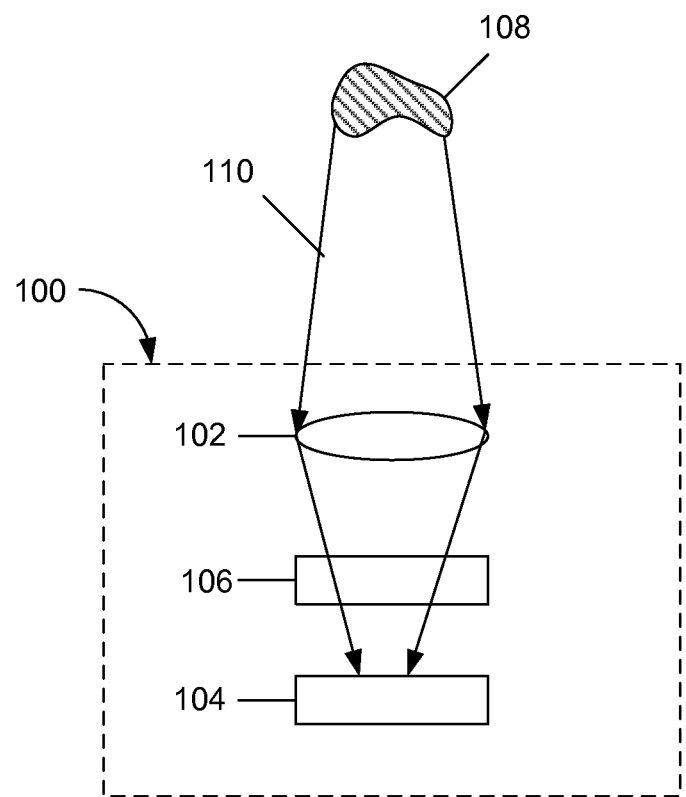
FIG. 1 shows a digital camera including an imaging lens, an image sensor, and an IR-cut filter for removing IR images.

FIG. 1 shows a digital camera 100 including an imaging lens 102, an image sensor 104, such as a CMOS or CCD image sensor, and an IR-cut filter 106 disposed between imaging lens 102 and image sensor 104. Imaging lens 102 forms an image of an object 108 at image sensor 104. Light 110 from object 108 passes through imaging lens 102 and IR-cut filter 106 and arrives at image sensor 104. The IR components of light 110 are blocked by IR-cut filter 106, thus the image formed at image sensor 104 contains little or no IR light components.

Figure 2:
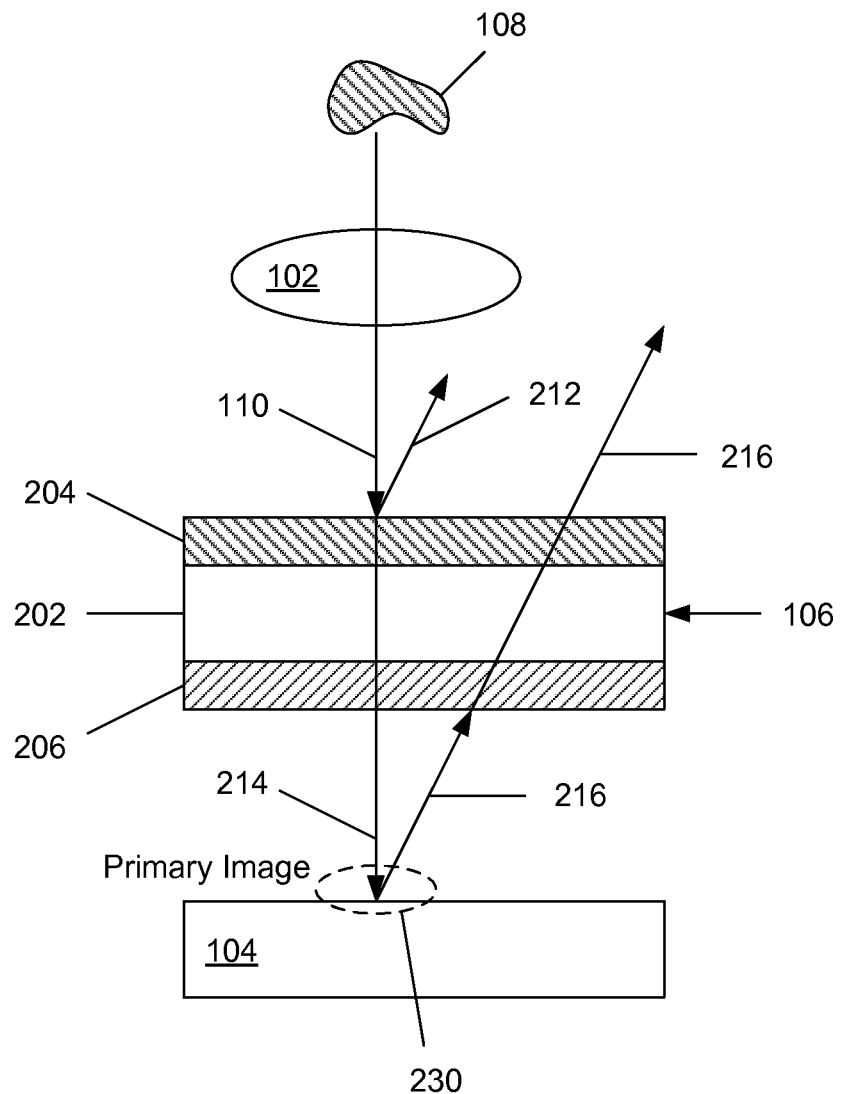
FIG. 2 shows an IR-cut filter including an IR reflecting film that reflects IR light.

FIG. 2 shows an IR-cut filter 106 used in a digital camera, such as digital camera 100 illustrated in FIG. 1. IR-cut filter 106 includes a transparent substrate 202. Transparent substrate 202 typically is made of glass, though other materials may be used. An IR reflecting film 204 is disposed on substrate 202 facing an imaging lens 102. IR reflecting film 204 may be an interference filter formed by a single layer or multi-layer coating. Light 110 from object 108 passes through lens 102 and is incident upon IR-cut filter 106. Due to light interference, IR light component 212, which are part of incident light 110, are reflected by IR reflective film 204. The remaining components of incident light 110, including visible light components (e.g., three primary colors such as red, green, and blue), transmit through IR reflective film 204 becoming transmitted light 214. An anti-reflection ("AR") film 206 is disposed on the opposite side of substrate 202 facing image sensor 104. AR film 206 may be fabricated as a single layer or multi-layer coating.

Transmitted light 214 forms a primary image 230 incident on image sensor 104. Primary image 230 contains no or significantly reduced IR light components. The majority of transmitted light 214 is absorbed by image sensor 104 and generates an electronic image. A small portion of transmitted light 214 is reflected at the surface of image sensor 104 becoming reflected light 216. Reflected light 216 may be produced by reflection at the surface, diffraction caused by the pixel structure within image sensor 104, or both. Reflected light 216 propagates through AR film 206, transparent substrate 202, and IR reflecting film 204 (if IR reflecting film 204 reflects only IR light and transmits visible light including red light).

In summary, IR-cut filter 106 is disposed between imaging lens 102 and image sensor 104. IR-cut filter 106 includes transparent substrate 202, IR reflecting film 204, and AR film 206. IR reflecting film 204 is disposed on transparent substrate 202 facing imaging lens 102, and AR film 206 is disposed on the other side of substrate 202 facing image sensor 104.

Figure 3:
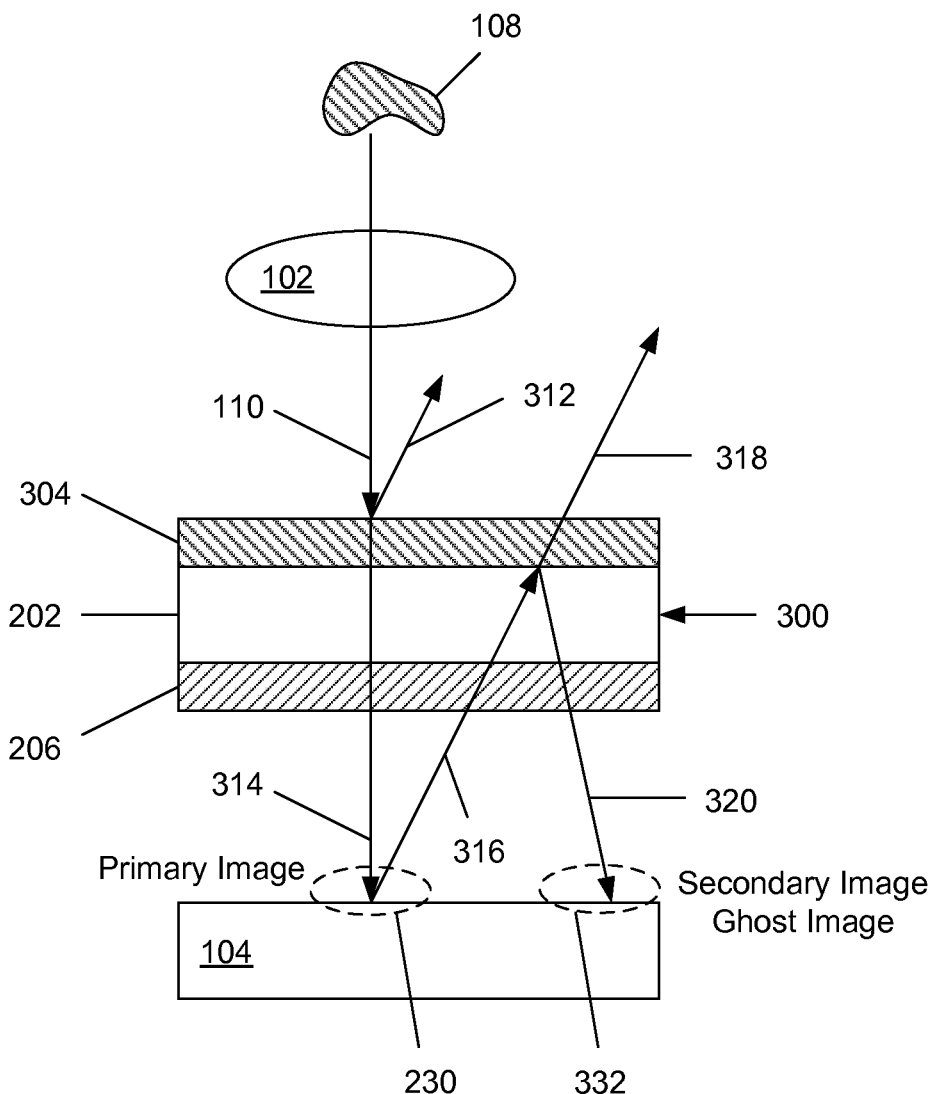
FIG. 3 shows an IR reflecting film also reflecting some red light and generating ghost images.

FIG. 3 illustrates how an IR reflecting film 304 of an IR-cut filter 300 does not fully transmit all visible light components of incident light 110. Rather, some visible light, especially red light which is close to the IR spectrum, e.g., $\lambda$>630 nm, may be partially reflected by IR reflecting film 304 together with IR light, becoming reflected light 312. In other words, the reflection spectrum of IR reflecting film 304 includes red light. The rest of incident light 110, which may contain less red and little or no IR light components, transmits through IR reflecting film 304 becoming transmitted light 314. Transmitted light 314 transmits through transparent substrate 202 and AR film 206 forming primary image 230 on image sensor 104. The majority of transmitted light 314 is absorbed by image sensor 104 to generate an electronic image. However, a small portion of transmitted light 314 is reflected at the surface of image sensor 104 becoming reflected light 316. Reflected light 316 may be produced by reflection at the surface, diffraction caused by the pixel structure within image sensor 104, or both. Reflected light 316 transmits through AR film 206 and substrate 202. Since the reflection spectrum of IR reflecting film 304 includes red light, red light contained in reflected light 316 is partially reflected by IR reflecting film 304 becoming red reflected light 320. The rest of reflected light 316 passes through IR reflecting film 304 becoming transmitted light 318.

Red reflected light travels back through substrate 202 and AR film 206 and arrives once again at image sensor 104 forming a secondary red image 332 known as a ghost image. Therefore, red reflected light 320 is detected by image sensor 104 and a ghost image 332 is produced.

Accordingly, although an IR-cut filter may block the majority of IR light, it may deleteriously produce a secondary red image known as a ghost image. This problem becomes serious when a picture of a bright object is taken. For example, when a picture including the sun is taken, multiple ghost images of sun in the red spectrum are produced. Ghosting images can appear in both still and video camera images.

Some methods for reducing the ghost image were disclosed in U.S. Pat. No. 7,038,722 to Kitagishi. The methods involved the fabrication of color filters within the color filter array (CFA) of an image sensor to have specific transmittances designed to match a specific IR-cut filter. Thus the image sensor is custom made for a given CFA. In contrast, embodiments of the present disclosure describe techniques for reducing the ghost image, which techniques can be applied to virtually any general image sensor without a CFA having specifically designed transmittances.

Figure 4:
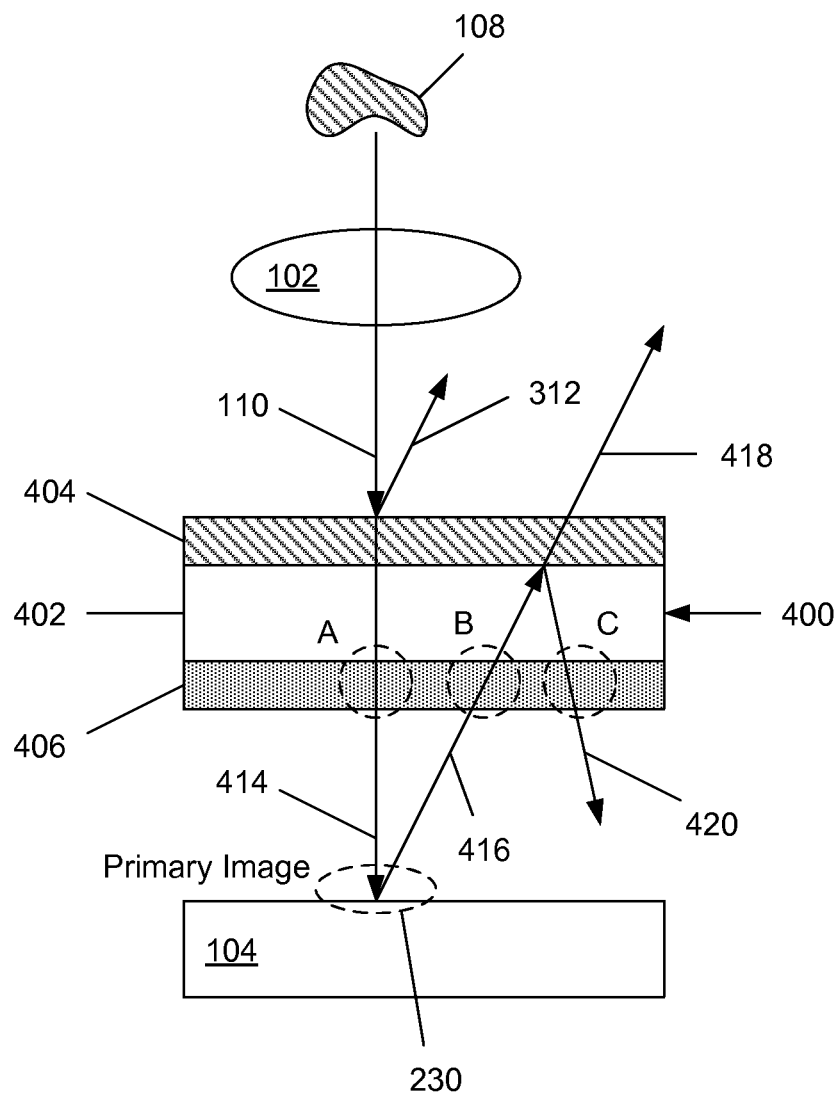
FIG. 4 shows an IR-cut filter including an IR reflecting film, a transparent substrate, and a red absorbing film, in accordance with an embodiment of the disclosure.

FIG. 4 illustrates an IR-cut filter 400 including a transparent substrate 402 and an IR reflecting film 404, in accordance with an embodiment of the disclosure. Transparent substrate 402 typically is made of glass, but other materials such as polyester and the like are possible. IR reflecting film 404 is disposed on substrate 402 facing imaging lens 102. IR reflecting film 404 may be an interference filter formed by a single layer or multi-layer coating. Light 110 from object 108 passes through lens 102 and is incident on filter 400. Due to light interference, the IR components contained in incident light 110 are reflected by film 404. However, IR reflecting film 404 does not fully transmit visible light from incident light 110. Some visible light, especially red light which is close to the IR light spectrum, may be partially reflected by IR reflecting film 404 together with the IR light components becoming reflected light 312. In other words, the reflection spectrum of IR reflecting film 404 includes red light. The rest of incident light 110, which may contain less red and no IR light, transmits through film 404 becoming transmitted light 414.

IR-cut filter 400 further includes a red absorbing film 406, which is disposed on the opposite side of substrate 402 facing image sensor 104. Transmitted light 414 passes through red absorbing film 406 for the first time at (A) and arrives at image sensor 104. Transmitted light 414 is then partially reflected at the surface of image sensor 104 becoming reflected light 416, which again passes through red absorbing film 406 for the second time at (B). The red light contained in reflected light 416 is then partially reflected by IR reflecting film 404 becoming red reflected light 420. The rest of reflected light 416 passes through IR reflecting film 404 becoming transmitted light 418. Red reflected light 420 again passes through red absorbing film 406 for the third time at (C). The three traversals of red absorbing film 406 reduces the intensity of red reflected light 420, to a substantially imperceptible level, such that virtually no ghost image is detectable. Of course, red absorbing film 406 does transmit some red light. If red absorbing film 406 fully absorbed red light, then no red primary image would be detected. Thus, red absorbing film 406 merely operates to partially absorb red light components, such that after three traversals of the film, the red components of light are substantially removed.

In one embodiment, red absorbing film 406 is essentially a cyan filter that partially absorbs/blocks red and transmits green and blue light. Thus, any suitable cyan filters, especially cyan filters similar to one in the color filter array (CFA) of a color image sensor may be used. Furthermore, a commercial cyan filter of 50 micron thick dyed polyester film on polyethylene terephthalate (PET) substrate may also be used, where the PET substrate functions as transparent substrate 402 and the dyed polyester film functions as red absorbing film 406.

Figure 5:
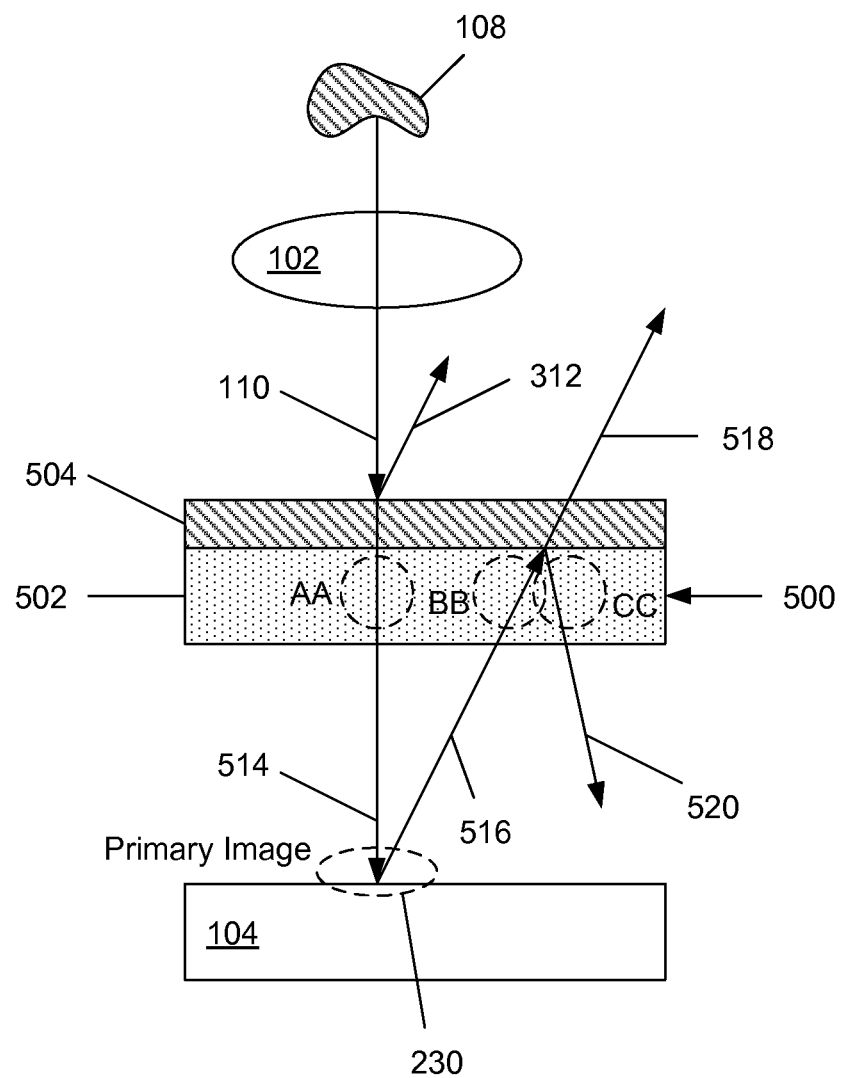
FIG. 5 shows an IR-cut filter including an IR reflecting film and a red absorbing substrate, in accordance with an embodiment of the disclosure.

FIG. 5 illustrates an IR-cut filter 500, in accordance with an embodiment of the disclosure. The illustrated embodiment of IR-cut filter 500 includes an IR reflecting film 504. IR reflecting film 504 may be an interference filter formed by a single layer or multi-layer coating. Light 110 from object 108 passes through lens 102 and is incident upon filter 500. Due to light interference, the IR light components contained within incident light 110 are reflected by film 504. However, IR reflecting film 504 does not fully transmit all visible light components of incident light 110. Rather, some red light components which are close to the IR spectrum, may be partially reflected by IR reflecting film 504 together with IR light becoming reflected light 312. In other words, the reflection spectrum of IR reflecting film 504 includes red light. The remaining incident light 110, which may contain less red and little or no IR light components, transmits through IR reflecting film 504 becoming transmitted light 514.

IR-cut filter 500 further includes a red absorbing substrate 502. In the illustrated embodiment, IR reflecting film 504 is disposed on red absorbing substrate 502 facing imaging lens 102. Transmitted light 514 passes through red absorbing substrate 502 for the first time at (AA) and arrives at image sensor 104. Light 514 is then partially reflected at the surface of image sensor 104 becoming reflected light 516, which passes red absorbing substrate 502 for the second time at (BB). The red light contained in reflected light 516 is partially reflected by IR reflecting film 504 becoming red reflected light 520. The rest of reflected light 516 passes through IR reflecting film 504 becoming transmitted light 518. Red reflected light 520 passes red absorbing substrate 502 for the third time at (CC). Three passages through red absorbing substrate 502 sufficiently reduces the intensity of red reflected light 520, thus that little or no ghost image is detected. Thus, red absorbing substrate 502 is only partially absorptive to red light so as pass a red primary image while sufficiently absorbing any red secondary image (ghost image).

In one embodiment, red absorbing substrate 502 is a cyan filter that blocks red and transmits green and blue light. Thus, a variety of cyan filters, for example, colored glass filters, may be used. Colored glass is glass formed with a color pigment mixed into the glass as opposed to a colored film coated on its surface. This is accomplished by mixing various metal oxides in the glass composition. These colored glasses are available from major glass producers such as Schott, Hoya, etc. Other colored substrates such as polyester and the like are also possible.

Figure 6:
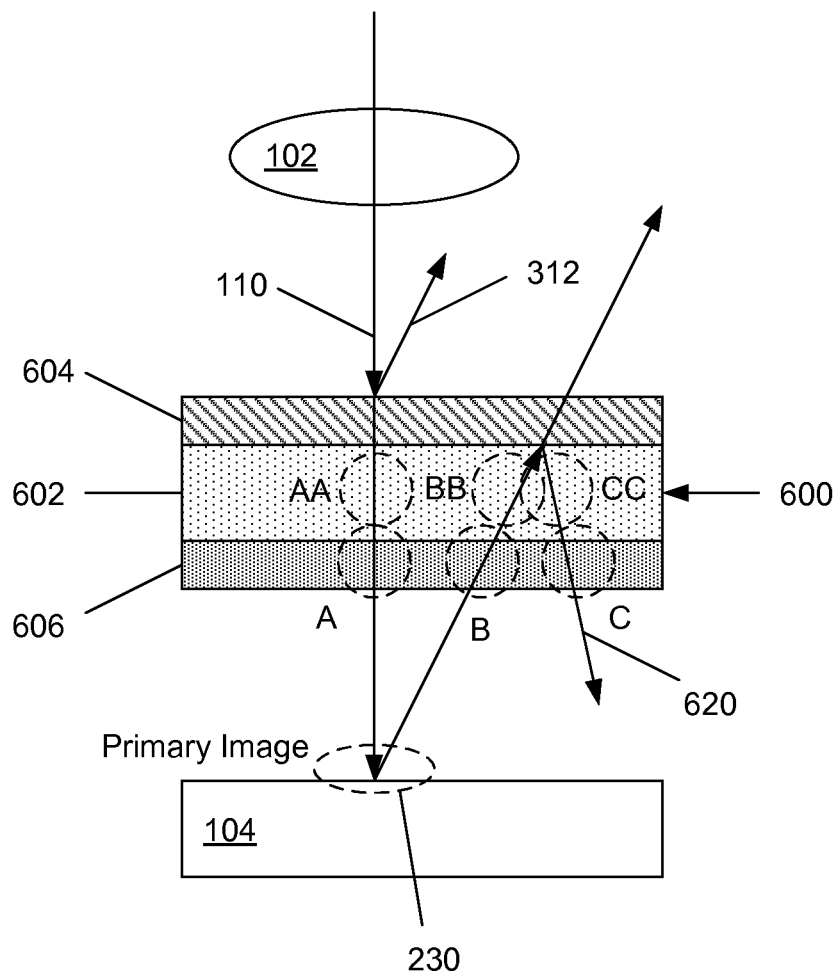
FIG. 6 shows an IR-cut filter including an IR reflecting film, a red absorbing substrate, and a red absorbing film, in accordance with an embodiment of the disclosure.

FIG. 6 illustrates an IR-cut filter 600, in accordance with an embodiment of the disclosure. The illustrated embodiment of IR-cut filter 600 includes an IR reflecting film 604, red absorbing substrate 602, similar to red absorbing substrate 502, and red absorbing film 606, similar to red absorbing film 406. Accordingly, prior to the formation of a secondary image, the incident light is absorbed three times by red absorbing substrate 602 at (AA), (BB), and (CC), and absorbed three times by red absorbing film 606 at (A), (B), and (C). Three passages through red absorbing substrate 602 and three passages through red absorbing film 606 sufficiently reduces the intensity of red reflected light 620, to substantially eliminate a ghost image.

Thus, IR-cut filters according to the illustrated embodiments includes an IR reflecting film and a red absorbing layer, which can be implemented as a red absorbing substrate or a red absorbing film disposed on a transparent substrate. An IR-cut filter may also include both a red absorbing substrate and a red absorbing film.

Embodiments of the IR reflecting film may be an interference filter. The reflection spectrum of the interference filter extends into the red spectrum from the IR spectrum. Prior to forming any ghost image, incident light is absorbed three times in a red absorbing layer, a first absorption occurs after transmission through the IR reflecting film, a second absorption occurs after reflection at the image sensor, and a third absorption occurs after reflection at the IR reflecting film.

Embodiments of the red absorbing layer may reduce the detected red intensity in the primary image resulting in a bluish primary image. However, this problem may be cured by adjusting the gains associate with each of the red, green, and blue signals, which may be conducted before (e.g., hardware logic) or after (e.g., post image processing or hardware logic adjustments) the image sensor is fabricated.

Figure 7:
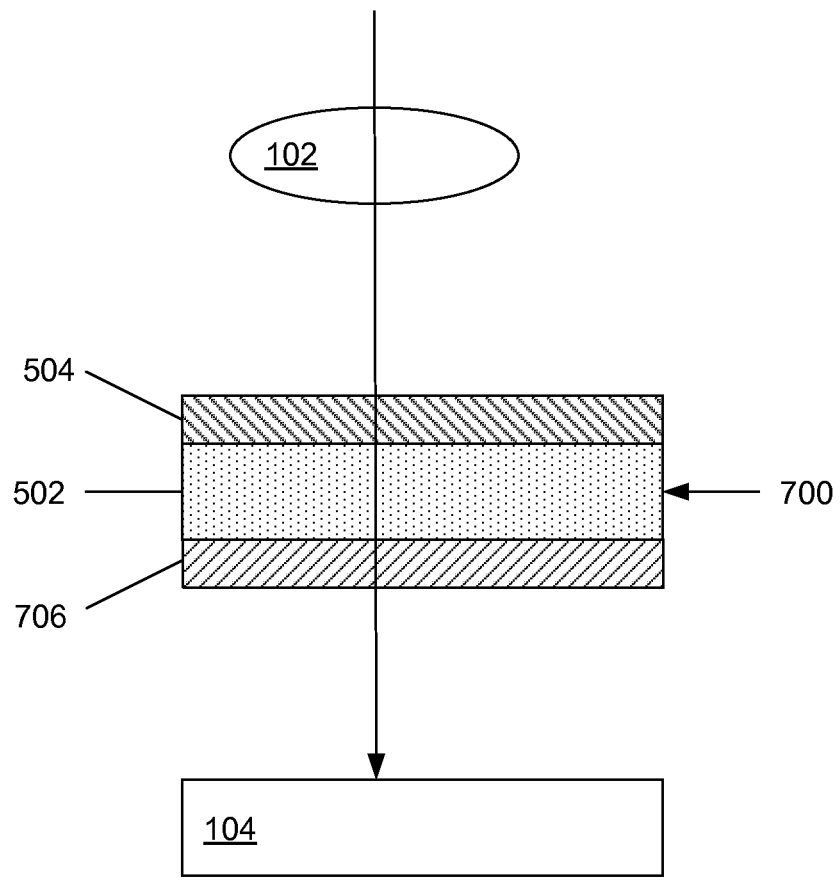
FIG. 7 shows an embodiment of FIG. 5 further including an anti-reflective ("AR") film, in accordance with an embodiment of the disclosure.

FIG. 7 illustrates an IR-cut filter 700 according to another embodiment of the disclosure. IR-cut filter 700 is similar to IR-cut filter 500 (FIG. 5), but further includes an AR film 706 disposed on red absorbing substrate 502 facing image sensor 104.

Figure 8:
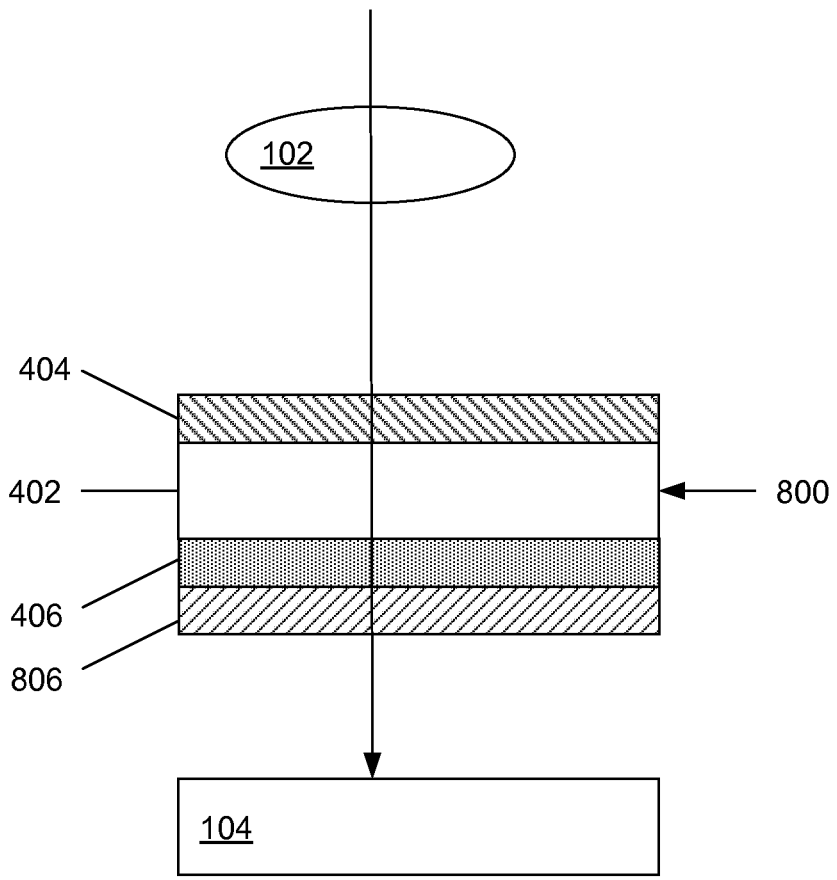
FIG. 8 shows an embodiment of FIG. 4 further including an AR film, in accordance with an embodiment of the disclosure.

FIG. 8 illustrates an IR-cut filter 800 according to another embodiment of the disclosure. IR-cut filter 800 is similar to IR-cut filter 400 (FIG. 4), but further including an AR film 806 disposed on red absorbing film 406 facing image sensor 104.

Figure 9:
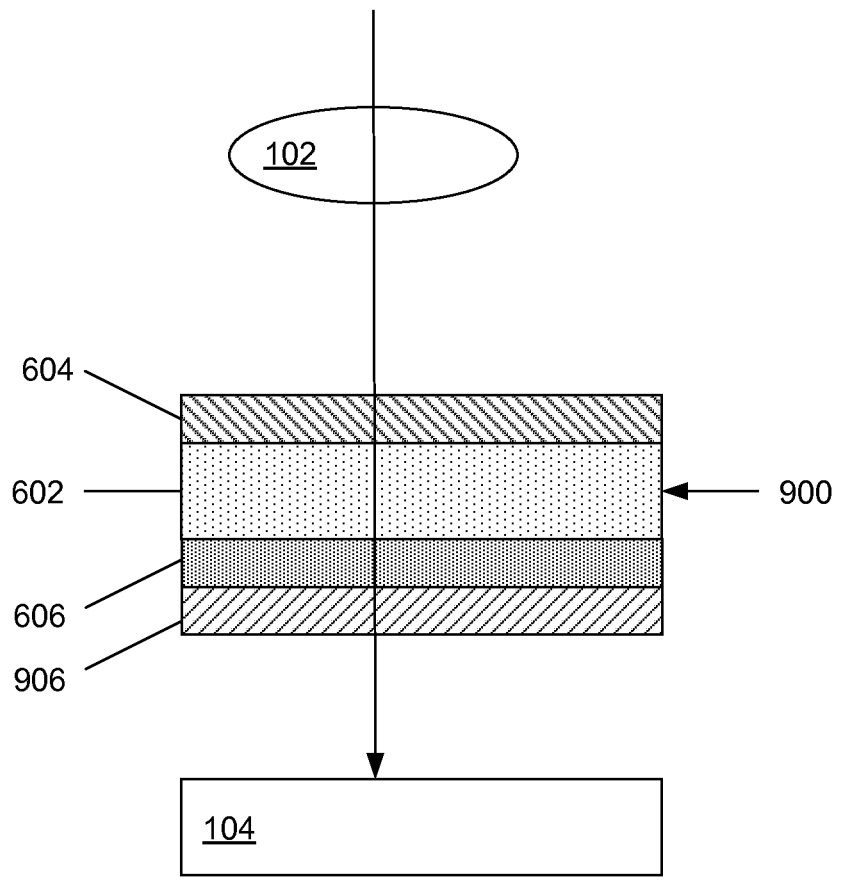
FIG. 9 shows an embodiment of FIG. 6 further including an AR film, in accordance with an embodiment of the disclosure.

FIG. 9 illustrates an IR-cut filter 900 according to another embodiment of the disclosure. IR-cut filter 900 is similar to IR-cut filter 600 (FIG. 6), but further including an AR film 906 disposed on red absorbing film 606 facing image sensor 104.

Figure 10A:
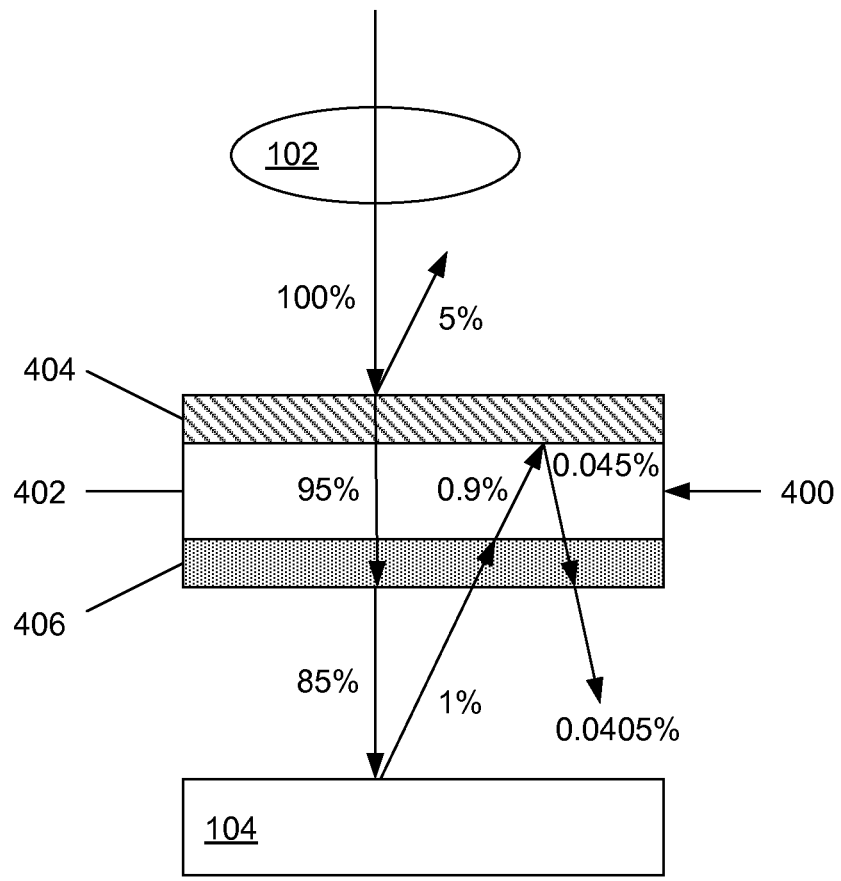
FIGS. 10a and 10b illustrate exemplary magnitudes of red light reflected by an IR-cut filter (a) having a red absorbing layer and (b) having no red absorbing layer, in accordance with embodiments of the disclosure.
Figure 10B:
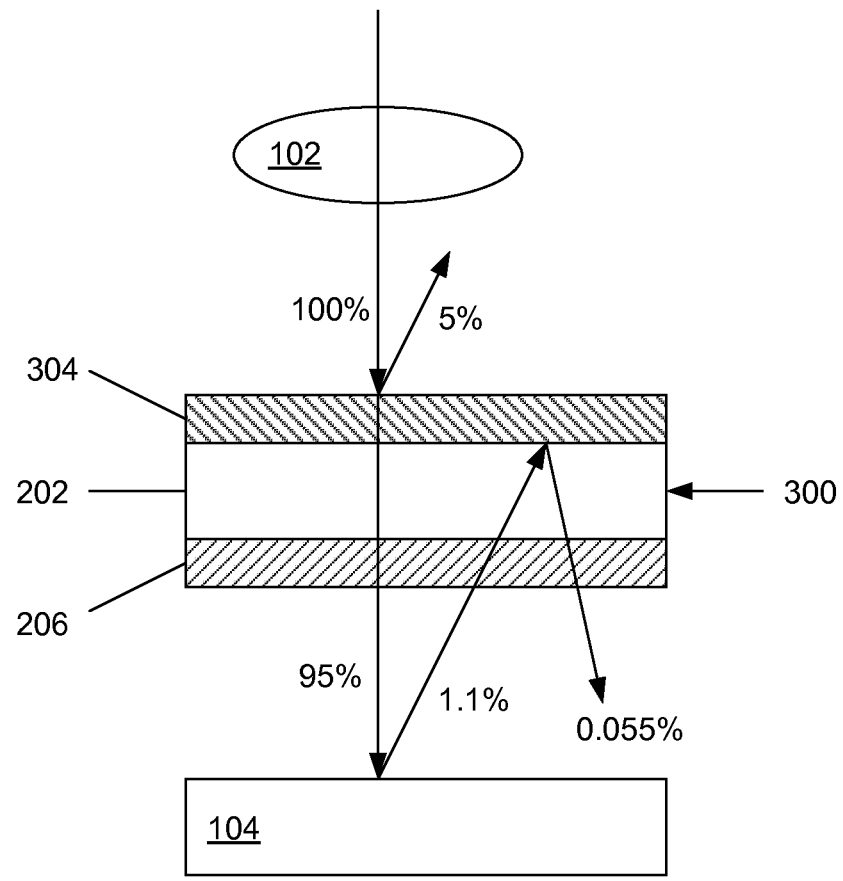

FIG. 10(*a*) illustrates an example of IR-cut filter 400 having a red absorbing layer 406. For example, IR reflecting film 404 may reflect 5% of red light, thus 95% of red light transmits through IR reflecting film 404. If red absorbing layer 406 absorbs 10% of red light, 85% of red light will be incident to image sensor 104. The pixel structure and the surface of image sensor 104 produce four reflected light beams in different directions. Assuming the total reflected light is 4%, then a reflected light beam is approximately 1%. After a second passage through red absorbing layer 406, the red light is 0.9%. Then 5% of the 0.9% of the red light is reflected by IR reflecting film 404. Thus 0.045% of the original red light is reflected by IR reflecting film 404. Finally, after the third passage through red absorbing layer 406, only 0.0405% of the original red light remains.

In contrast, FIG. 10(*b*) illustrates an example of an IR-cut filter 300 without any red absorbing layer. After transmitting IR reflecting film 304, the red light is 95%. After the reflection at image sensor 104, the red light is 1.1%. After the reflection at IR reflecting film 304, 0.055% red light remains. Thus, by using a single red absorbing layer of 10% absorption, the magnitude of red reflected light is reduced more than 25%. The use of two red absorbing layers will reduce reflected red light by more than 50%. To further reduce the magnitude of red reflected light, a red absorbing layer with higher absorption coefficient, e.g., 20% or 30%, may be used.

Figure 11:
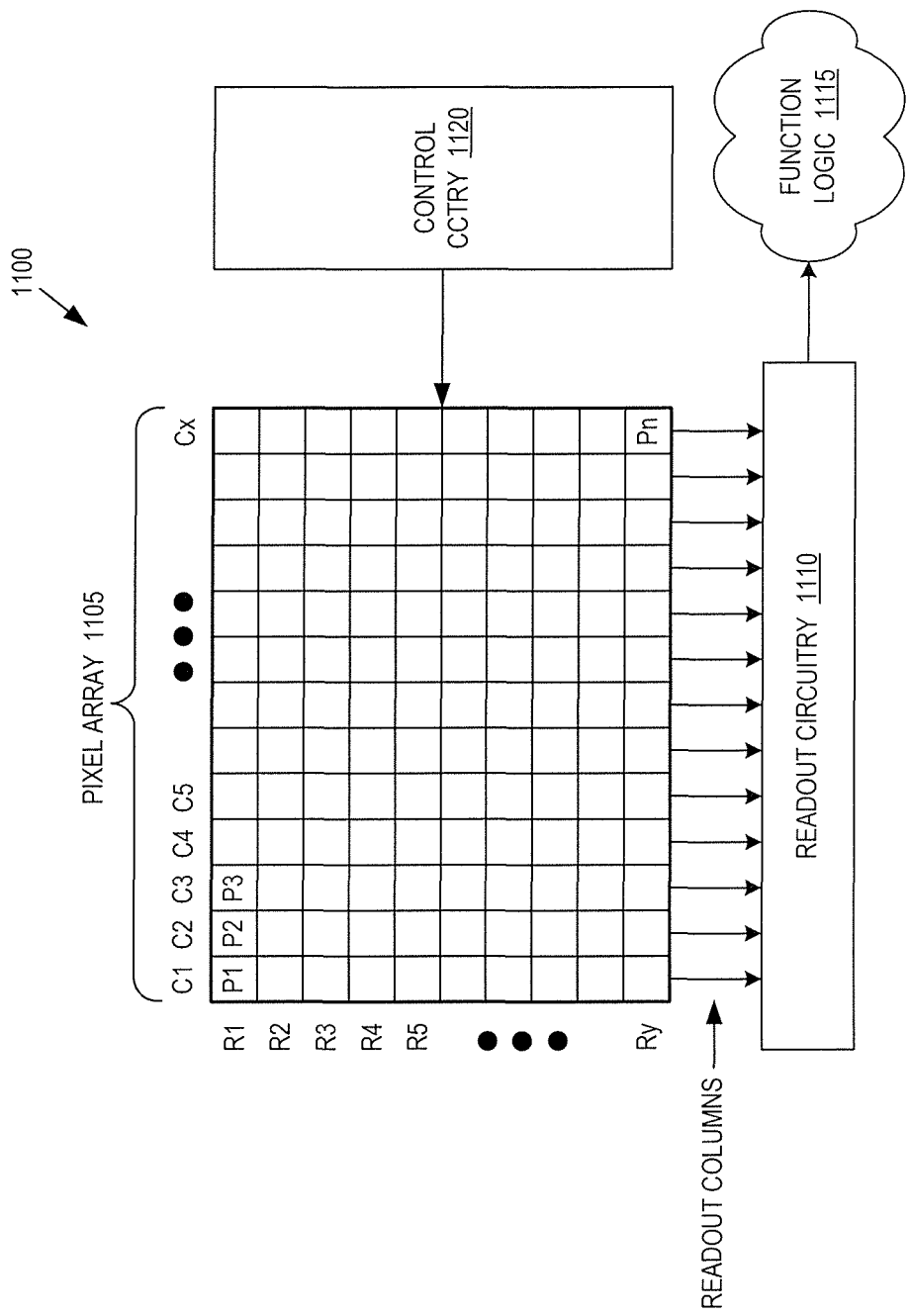
FIG. 11 is a functional block diagram illustrating an imaging system, in accordance with an embodiment of the disclosure.

FIG. 11 is a functional block diagram illustrating an imaging system 1100, in accordance with an embodiment of the disclosure. The illustrated embodiment of imaging system 1100 includes a pixel array 1105, readout circuitry 1110, function logic 1115, and control circuitry 1120. Imaging system 1100 is one possible implementation of image sensor 104, described above.

Pixel array 1105 is a two-dimensional ("2D") array of imaging sensors or pixels (e.g., pixels P1, P2 . . . , Pn). In one embodiment, each pixel is a complementary metal-oxide-semiconductor ("CMOS") imaging pixel. In other embodiments, each pixel may be implemented as a CCD. As illustrated, each pixel is arranged into a row (e.g., rows R1 to Ry) and a column (e.g., column C1 to Cx) to acquire image data of a person, place, or object, which can then be used to render a 2D image of the person, place, or object.

After each pixel has acquired its image data or image charge, the image data is readout by readout circuitry 1110 and transferred to function logic 1115. Readout circuitry 1110 may include amplification circuitry, analog-to-digital ("ADC") conversion circuitry, or otherwise. Function logic 1115 may simply store the image data or even manipulate the image data by applying post image effects (e.g., crop, rotate, remove red eye, adjust brightness, adjust contrast, or otherwise). In one embodiment, readout circuitry 1110 may readout a row of image data at a time along readout column lines (illustrated) or may readout the image data using a variety of other techniques (not illustrated), such as a serial readout, a full parallel readout of all pixels simultaneously, or otherwise.

Control circuitry 1120 is coupled to pixel array 1105 to control operational characteristic of pixel array 1105. For example, control circuitry 1120 may generate a shutter signal for controlling image acquisition. In one embodiment, the shutter signal is a global shutter signal for simultaneously enabling all pixels within pixel array 205 to simultaneously capture their respective image data during a single acquisition window. In an alternative embodiment, the shutter signal is a rolling shutter signal whereby each row, column, or group of pixels is sequentially enabled during consecutive acquisition windows.

The above description of illustrated embodiments of the disclosure, including what is described in the abstract, is not intended to be exhaustive or to limit the disclosure to the precise forms disclosed. While specific embodiments of, and examples for, the disclosure are described herein for illustrative purposes, various equivalent modifications are possible within the scope of the invention, as those skilled in the relevant art will recognize. These modifications can be made to the disclosure in light of the above detailed description.

The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A camera apparatus, comprising:
    an image sensor to capture image light and generate an image in response to the image light;
    an imaging lens optically aligned with the image sensor to focus the image light onto the image sensor; and
    an infrared cut filter disposed between the imaging lens and the image sensor to remove infrared light components from the image light prior to the image light reaching the image sensor, the infrared cut filter including:
        at least one red absorbing layer that partially absorbs red light components within the image light; and
        an infrared reflector that reflects the infrared light components, the infrared reflector disposed between the red absorbing layer and the imaging lens,
    wherein the at least one red absorbing layer is a cyan filter that absorbs more red light than green, blue, and infrared light,
    wherein the at least one red absorbing layer is disposed between the infrared reflector and the image sensor to reduce red ghost images in the image light incident upon the image sensor.

2. The camera apparatus of claim 1, wherein the at least one red absorbing layer comprises a red absorbing substrate, and wherein the infrared reflector comprises an infrared reflecting film disposed on the red absorbing substrate facing the imaging lens.

3. The camera apparatus of claim 2, wherein the red absorbing substrate comprises pigmented glass.

4. The camera apparatus of claim 2, wherein the at least one red absorbing layer further comprises a red absorbing film disposed on the red absorbing substrate and facing the image sensor.

5. The camera apparatus of claim 4, wherein the infrared cut filter further comprises an anti-reflective film disposed on the red absorbing film and facing the image sensor.

6. The camera apparatus of claim 2, wherein the infrared cut filter further comprises an anti-reflective film disposed between the at least one red absorbing layer and the image sensor.

7. The camera apparatus of claim 1, wherein the infrared cut filter further comprises a substantially transparent substrate that is substantially colorless disposed between the at least one red absorbing layer and the infrared reflector.

8. The camera apparatus of claim 7, wherein the at least one red absorbing layer comprises a red absorbing film disposed on the substantially transparent substrate and facing the image sensor.

9. The camera apparatus of claim 8, wherein the infrared cut filter further comprises an anti-reflecting film disposed on the red absorbing film and facing the image sensor.

10. The camera apparatus of claim 1, wherein the infrared reflector is at least partially reflective to at least a portion of the red light components within the image light, such that multiple absorptions of reflected red light reduce red image ghosting.

11. The camera apparatus of claim 1, wherein the infrared reflector comprises a multi-layer interference filter having a reflection spectrum that extends from an infrared spectrum into a portion of a visible red spectrum.

12. An infrared cut filter for use with an image sensor to remove infrared light components from image light received from a first side of the infrared cut filter prior to the image light reaching the image sensor to be disposed on a second side of the infrared cut filter, the infrared cut filter comprising:
    at least one red absorbing layer that partially absorbs red light components within the image light; and
    an infrared reflector that reflects the infrared light components,
    wherein the infrared reflector is disposed between the red absorbing layer and the first side of the infrared cut filter,
    wherein the at least one red absorbing layer is disposed between the infrared reflector and the second side of the infrared cut filter, which is opposite the first side,
    wherein the at least one red absorbing layer is a cyan filter that absorbs more red light than green, blue, and infrared light,
    wherein the at least one red absorbing layer is positioned to be disposed between the infrared reflector and the image sensor to reduce red ghost images in the image light.

13. The infrared cut filter of claim 12, wherein the at least one red absorbing layer comprises a red absorbing substrate, and wherein the infrared reflector comprises an infrared reflecting film disposed on the red absorbing substrate between the red absorbing substrate and the first side of the infrared cut filter.

14. The infrared cut filter of claim 13, wherein the red absorbing substrate comprises pigmented glass.

15. The infrared cut filter of claim 13, wherein the at least one red absorbing layer further comprises a red absorbing film disposed on the red absorbing substrate between the red absorbing substrate and the second side of the infrared cut filter.

16. The infrared cut filter of claim 15, wherein the infrared cut filter further comprises an anti-reflective film disposed on the red absorbing film between the red absorbing film and the second side of the infrared cut filter.

17. The infrared cut filter of claim 12, wherein the infrared cut filter further comprises a substantially transparent substrate that is substantially colorless disposed between the at least one red absorbing layer and the infrared reflector.

18. The infrared cut filter of claim 17, wherein the at least one red absorbing layer comprises a red absorbing film disposed on the substantially transparent substrate between the substantially transparent substrate and the second side of the infrared cut filter.

19. The infrared cut filter of claim 18, wherein the infrared cut filter further comprises an anti-reflecting film disposed on the red absorbing film between the red absorbing film and second side of the infrared cut filter.

20. The infrared cut filter of claim 12, wherein the infrared reflector is at least partially reflective to at least a portion of the red light components within the image light such that multiple absorptions of reflected red light reduce red image ghosting.

21. The infrared cut filter of claim 12, wherein the infrared reflector comprises a multi-layer interference filter having a reflection spectrum that extends from an infrared spectrum into a portion of a visible red spectrum.

22. The infrared cut filter of claim 12, wherein the at least one red absorbing layer comprises a cyan filter.

\* \* \* \* \*